United States Patent [19]

Mantius et al.

[11] Patent Number: 5,320,861
[45] Date of Patent: Jun. 14, 1994

[54] FRUIT EXTRACTION AND INFUSION

[75] Inventors: Harold L. Mantius, Raynham; Peter R. Peterson, Taunton, both of Mass.

[73] Assignee: Ocean Spray Cranberries, Inc., Lakeville-Middleboro, Mass.

[21] Appl. No.: 816,803

[22] Filed: Jan. 3, 1992

[51] Int. Cl.⁵ .......................... A23L 2/04; A23L 3/40
[52] U.S. Cl. ................................. 426/599; 426/640; 426/655; 99/495
[58] Field of Search ................ 426/639, 655, 640, 599

[56] References Cited

U.S. PATENT DOCUMENTS

| | | |
|---|---|---|
| 19,421 | 2/1858 | Helton . |
| 1,704,367 | 3/1929 | Moore . |
| 1,763,121 | 6/1930 | Bailey . |
| 1,858,796 | 5/1932 | Wilcoxson . |
| 2,080,542 | 5/1937 | Kuss et al. . |
| 2,139,585 | 12/1938 | Hunter ............................ 134/60 |
| 2,491,115 | 12/1949 | Kincaide . |
| 2,509,543 | 5/1950 | Truax et al. ......................... 259/6 |
| 2,554,769 | 5/1951 | Arnold ............................. 259/109 |
| 2,571,300 | 10/1951 | Simpson . |
| 2,626,856 | 1/1953 | Alles ................................. 23/284 |
| 2,692,831 | 10/1954 | Weckel et al. . |
| 2,746,730 | 5/1956 | Swenson et al. ..................... 259/9 |
| 2,785,071 | 3/1957 | Matthews ............................ 99/102 |
| 2,847,282 | 8/1958 | Dunning et al. . |
| 2,865,758 | 12/1958 | Weckel ................................. 99/102 |
| 3,057,736 | 2/1960 | Forkner ................................ 99/204 |
| 3,142,574 | 7/1964 | Anderson ............................. 99/102 |
| 3,723,487 | 3/1973 | Couche ............................. 260/412.4 |
| 3,800,055 | 3/1974 | Gallagher ........................... 426/432 |
| 4,048,343 | 9/1977 | Levine . |
| 4,205,919 | 6/1980 | Attwell ................................. 366/34 |
| 4,225,628 | 9/1980 | Lynn . |
| 4,326,926 | 4/1982 | Gerow . |
| 4,363,264 | 12/1982 | Lang et al. . |
| 4,390,550 | 6/1983 | Kahn et al. ......................... 426/102 |
| 4,497,838 | 2/1985 | Bonnell .............................. 426/429 |
| 4,551,348 | 11/1985 | O'Mahoney et al. ............... 426/639 |
| 4,647,466 | 3/1987 | Japikse et al. ...................... 426/639 |
| 4,693,905 | 9/1987 | Japikse et al. ...................... 426/387 |
| 4,775,545 | 10/1988 | Augustine et al. ................. 426/639 |
| 4,789,558 | 12/1988 | Winkler et al. . |
| 4,814,190 | 3/1989 | Ismail .................................. 426/102 |
| 4,818,555 | 4/1989 | Piotrowski et al. ................ 426/599 |
| 4,873,095 | 10/1989 | Rundle ................................ 426/50 |
| 4,889,739 | 12/1989 | Powers et al. ....................... 426/599 |
| 4,902,518 | 2/1990 | Lang et al. ........................... 426/14 |
| 4,938,985 | 7/1990 | Swaine, Jr. et al. ................ 426/599 |

FOREIGN PATENT DOCUMENTS

| | | |
|---|---|---|
| 69835/87 | 3/1987 | Australia . |
| 878427 | 8/1971 | Canada . |
| 0130660 | 1/1985 | European Pat. Off. . |
| 1179183 | 10/1964 | Fed. Rep. of Germany . |
| 2459407 | 11/1976 | Fed. Rep. of Germany . |
| 8604126 | 2/1986 | Fed. Rep. of Germany . |
| 400678/A1 | 9/1991 | Fed. Rep. of Germany . |
| WO87/05255 | 9/1987 | PCT Int'l Appl. . |
| WO90/05463 | 5/1990 | PCT Int'l Appl. . |

OTHER PUBLICATIONS

Commercial Fruit Processing, Edition 2, Edited by Woodruff, J. G.; Bor Shiun Luh, USA, 1986, pp. 191-198, 321, 433-436.

Shukla, "Osmotic Dehydration", Cereal Foods World, p. 687.

Primary Examiner—Carolyn Paden
Attorney, Agent, or Firm—Fish & Richardson

[57] ABSTRACT

Extraction, especially of firm fruit such as cranberries, with improved yields of high quality, low tannin juices by using an improved countercurrent extractor employing longitudinal members positioned between adjacent flights and reinfusion of decharacterized, extracted fruit pieces with infusion syrups, such as juices from fruits other than that extracted, to produce a fruit food product of various flavors having a desired level of inherent soluble fruit component, without the need to bleed off spent syrup as a byproduct.

41 Claims, 3 Drawing Sheets

FRUIT EXTRACTION AND INFUSION

FRUIT EXTRACTION AND INFUSION

Field of the Invention

This invention relates to the extraction and infusion of fruits, especially cranberries, for producing various food products.

BACKGROUND OF THE INVENTION

Countercurrent extractors are used in the fruit processing industry for extraction of juices from solid fruit matter. The extractor includes a screw conveyor which urges fruit solids in a first direction, while extraction fluid flows in the opposite direction, extracting juice from the solids by osmosis. Other juice extraction methods used in the processing of cranberries include processes which utilize presses in conjunction with pressing aids (e.g., rice hulls) to produce a high quality single strength juice. Higher yield processes often utilize enzymatic treatment at elevated temperature to break down pectin in raw fruit prior to extraction and may result in a juice of substantially lower quality.

SUMMARY OF THE INVENTION

In aspects of the invention, fruits, especially firm berry fruits such as cranberries, are extracted by an improved countercurrent extraction apparatus resulting in improved and surprising yields of high quality juice, without the need for pressing aids, enzymatic treatments, non excessive heating of extraction liquid or extracted juice mixtures or the fruit itself. Further, because enzymes and high temperatures need not be used, the fruit maintains substantial physical integrity in a decharacterized form post extraction. The decharacterized fruit, a product of the juice extraction process, may be used as a carrier for various flavorings by infusing the decharacterized fruit with a flavored liquid infusion syrup. Particularly, infusion may be achieved with a countercurrent apparatus similar to that used for extraction with the decharacterized fruit being loaded as a solid and the infusion syrup, carrying the flavoring, introduced in a countercurrent fashion. The resulting infused food product, still maintaining substantial physical integrity of the original raw fruit, provides unique flavors by virtue of the various infusion fluids possible, such as fruit juices from fruits other than the fruit decharacterized. The infused fruit product may also maintain the characteristic flavor of the fruit itself to a desired degree.

In various aspects, a sequential, two-step process, extraction followed by infusion is taught herein, that provides particular advantages, especially over processes which simultaneously extract and infuse by soaking fruit in a liquid infusion syrup. In the latter processes, control over the level of natural or inherent soluble fruit component (the composition of materials that contribute to characteristic fruit flavor, including soluble solids such as combinations of sugars and other components, present in the fruit at natural relative levels) in the infused fruit product can be achieved by adjusting the ratio of infusion syrup to fruit, in order to extract the requisite amount of inherent soluble fruit component into the infusion medium, discharging a fraction of the medium as a relatively low value spent syrup byproduct and recycling the remaining fraction to infuse and extract more fruit. Recycling the spent syrup in its entirety causes the level of inherent soluble fruit component in the infusion syrup feed to asymptotically approach that of the fruit feed over time as the syrup is cycled through successive batches or a continuous flow of fruit and renders control over the formulation of the infused fruit product at any target level of inherent soluble fruit component below that characteristic of the fruit virtually impossible.

In the two-step process, on the other hand, the level of inherent soluble fruit component in the infused product can be controlled by the degree of extraction achieved in the extraction step and the degree of infusion of formulated infusion syrup achieved in the infusion step. Preferably, most of the inherent soluble fruit component is extracted from raw fruit to produce a large volume of high quality juice of high commercial value, with a predetermined amount of inherent soluble fruit component retained in the decharacterized fruit so that it maintains partially the natural fruit flavor. In the infusion step, the infusion syrup is formulated with inherent soluble fruit component (e.g. by using juice or juice concentrate) and non-inherent components (e.g. sugars, acids and/or other flavorings and components not present in the natural fruit or not present at the same relative levels as in the natural fruit) in such a manner as to control the formulation of the infused fruit product with respect to its inherent soluble fruit component without the need to bleed off spent syrup as a byproduct of the process. Preferably, there is no net extraction of the inherent component into the infusion media in the infusion step, i.e., the infusion syrup is formulated such that the level of inherent fruit component is equal to or greater than that in the decharacterized fruit. In preferred embodiments, the infusion is carried out with a countercurrent apparatus, and the spent syrup is concentrated to remove excess water and recycled in its entirety.

For example, raw fruit is extracted such that post extraction the decharacterized fruit contains a small amount, e.g. 1% by weight, of inherent soluble fruit component and a large amount of the extraction fluid, typically pure water. The infusion syrup is formulated such that the level of inherent soluble fruit component in the infusion syrup is approximately 1% by weight; equal in concentration to the level in the decharacterized fruit. During infusion, no net infusion or extraction of inherent soluble fruit component occurs. The spent syrup exiting the infuser is a blend of inherent and non-inherent soluble components diluted by water extracted from the fruit. This spent syrup, comprising a higher relative proportion of inherent fruit component when compared to the target infusion syrup formulation, can be recovered and recycled in its entirety by concentrating to remove the excess water and adding the requisite amount of non-inherent components to adjust the formulation in line with the desired infusion syrup feed. If the syrup is formulated to comprise a higher concentration of inherent fruit component than in the extracted fruit, there will be a net infusion of the inherent fruit components into the decharacterized fruit. In this case, the spent syrup can be recycled in its entirety by concentrating to remove the excess water and adding the requisite amount of inherent fruit components (e.g., by adding juice or juice concentrate) to adjust the formulation in line with the desired infusion syrup feed. In either case, the syrup can be concentrated without the aid of enzymes to a level appropriate for subsequent formulation in infusion syrup. Thus, there is no need to bleed off spent syrup as a low value byproduct, since it can be concentrated and then recycled in its entirety without adversely effecting the formulation of the infused fruit product.

By contrast, in processes which simultaneously extract and infuse by soaking fruit in an infusion syrup (as previously discussed), to produce an infused product having a low inherent fruit component level only a fraction of the spent syrup generated can be recycled. In effect, the level of inherent soluble fruit component in the infused product can only be controlled by removing the requisite amount of inherent soluble fruit component in spent syrup as a low value byproduct.

The invention is therefore of a particular economic advantage since the inherent fruit component which needs to be removed from the fruit (in order to control the formulation of the infused product) is removed up front, prior to infusion, as a high value high quality fruit juice. Process costs are also significantly reduced by the more efficient handling of spent infusion syrup. Further, this feature is of particular importance for infusion of high-acid fruits, such as cranberries, which require low controlled amounts of inherent soluble fruit component to enhance sweetness and make the infused fruit product more palatable but still reminiscent of cranberry flavor.

"Decharacterized fruit" as used herein refers to whole fruit or fruit pieces that have been subjected to extraction such that at least 50% of soluble solids have been removed. "Firm fruit" as used herein are those which resist structural collapse under substantial compression and typically are extracted in prior processes with the aid of pectinase enzymes and/or high temperature to increase yield. Examples include, apples, cranberries, cherries and grapes. On the other hand, "soft fruits" are easily collapsed. Examples include raspberries, blackberry and the meat of various fruits especially tropical fruits, e.g., kiwi, guava, mango and passion. (Fruits of this type are also typically extracted in prior processes with the aid of enzymes and/or high temperatures to increase yield.) It will be understood that processes of the invention may achieve advantages such as improved yield, quality and lower cost with many fruits. All percentages herein are by weight unless otherwise indicated or apparent.

In a first aspect, the invention features a countercurrent apparatus for use with fruit solids that has an elongate housing in the form of a trough or tube with an inlet at or adjacent one end and an outlet at or adjacent the other end. A screw conveyor with a substantially helical flight is disposed within the housing. The flight is rotatable about its longitudinal axis for moving fruit solids which have been introduced into the housing through the inlet from the one end to the other end of the housing. Means are provided for introducing liquid into the other end of the housing in a manner such that introduced liquid will flow along the housing to the one end thereof and counter current to the fruit solids. A drive means causes the screw conveyor to rotate for providing a net forward motion of the fruit solids from the one end to the other end. Means are also provided for withdrawing liquid from the housing at a point at or adjacent the one end thereof. The apparatus is characterized by a screw conveyor that includes a series of narrow longitudinal members parallel to the conveyor axis positioned between adjacent flights.

Various embodiments include the following features. The longitudinal members are radially positioned from the periphery, preferably, about 10% to 70% the distance from the periphery to the axis of the flights. There are 1 to 12 longitudinal members per square foot of flight area. The longitudinal members are positioned in a circumferential pattern about the axis of the flights. Two sets of members are provided at different radii from the axis. One set of longitudinal members are provided at a radius of about 25% the distance from the periphery of said flight to the axis and a second set of longitudinal members at a radius about 50% the distance from the periphery to the axis of said flight. The longitudinal members may be relatively rigid wires or rods with a diameter in the range of 0.032 to 0.500 inches. The direction of rotation of the screw conveyor is intermittently reversed.

In another aspect, the invention features extracting juice from fruit by providing raw fruit in a dimensionally stable form, penetrating the skin of the fruit to expose the inside of the fruit, unprotected by skin, and treating the fruit with a liquid in a countercurrent apparatus by advancing the fruit along a path while flowing the liquid countercurrently to the advancing fruit and uniformly, continuously tumbling the fruit while treating the fruit with the liquid and maintaining a process temperature of about 75° F. or less during extraction, and collecting the extract from the fruit.

In another aspect, the invention features treating fruit by providing raw fruit, penetrating the fruit to expose the inside of the fruit, unprotected by the skin, countercurrently extracting juice from the fruit with an extraction liquid to provide extracted fruit, collecting the extract from the fruit, collecting the extracted fruit, subjecting the extracted fruit to countercurrent infusion with an infusion liquid to provide an infused fruit, and collecting the infused fruit.

In another aspect, the invention features a method for processing fruit by providing raw fruit, penetrating the fruit to expose the inside of the fruit, unprotected by the skin, extracting the fruit with an extraction liquid to provide decharacterized fruit having a desired level of inherent soluble fruit component, collecting the extract from the fruit, collecting the decharacterized fruit, formulating an infusion liquid having inherent soluble fruit component at a level equal to or greater than the decharacterized fruit, infusing the decharacterized fruit with the infusion liquid without net extraction of the inherent soluble fruit component from the decharacterized fruit, collecting the spent infusion liquid after infusion, concentrating the spent liquid, recycling the concentrated spent liquid in its entirety for subsequent infusion, and collecting the infused fruit.

The features of these aspects may be combined. In addition, various embodiments may include one or more of the following features. The raw fruit is frozen prior to extraction. The residence time of fruit for extraction is greater than about 90 minutes, such as about 120 to 150 minutes. The extraction liquid is substantially free of pectinase enzymes, e.g. the extraction liquid is water. Uniformly tumbling is achieved between the flights of a screw conveyer by passing narrow longitudinal members positioned parallel to the axis of the screw through the fruit. A temperature of about 100° to 130° F. is maintained during the infusion step. The residence time of the fruit is about 120 to 300 minutes during the infusion. The fruit is cranberry. The method includes concentrating the spent liquid by removing excess water, reformulating the infusion liquid by adding a desired amount of inherent and/or non-inherent soluble components to concentrated, spent liquid, and recycling the reformulated liquid in its entirety for subsequent infusion. The infusion liquid is selected from fruit juice, fruit juice concentrate, corn syrup, sugar-water solutions, artificial sweeteners or any combination of the above, and may be fortified with flavorings, vitamins, and/or minerals. The infusion liquid has 60 to 80 brix. The decharacterized fruit has been extracted of about 94 to 98% of soluble solids. The decharacterized fruit is infused to about 40 to 55 brix. The infused fruit is dried to remove excess water to a water activity of 0.5 to 0.55.

In another aspect, the invention features food products made by method aspects of the invention. The food product may be a decharacterized cranberry having removed therefrom at least about 90% of its inherent soluble solids and including therein a flavor syrup.

Embodiments may include the following. The decharacterized fruit piece has about 94 to 98% of the inherent soluble solids removed. The syrup is a fruit flavor different from the fruit piece. The food product has brix of about 40 or greater. The fruit is a cranberry. The decharacterized fruit is free from enzyme degradation and substantially maintains the structural integrity of raw fruit, being untreated by pectinase enzymes. The decharacterized fruit has been extracted of about 50% or more of its original color (total anthrocyanine content measured by alcohol extraction).

Other aspects, features and advantages follow.

DETAILED DESCRIPTION

We first briefly describe the drawings.

Drawings

EXTRACTOR/INFUSER

Figure 1:
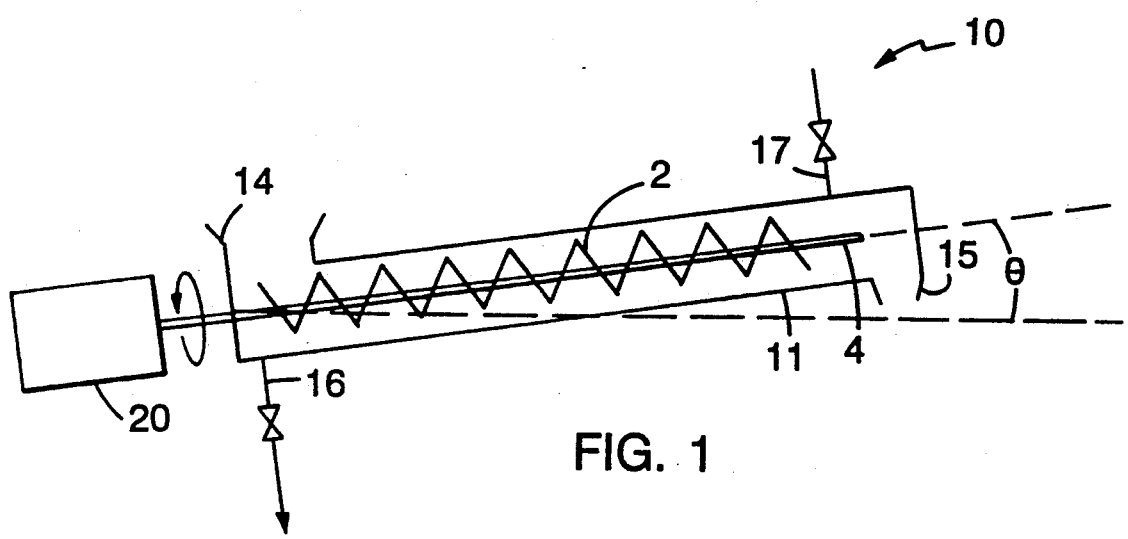
FIG. 1 is a side view schematic of a countercurrent extractor.

Referring to FIG. 1, a countercurrent apparatus 10 for use, e.g., as an extractor, includes an elongate troughshaped housing 11 with a helical screw conveyor 2 intermittently rotated by a motor means 20, connected to a shaft 4 on its longitudinal axis. Housing 11 has an inlet hopper 14 for the introduction of material to be extracted, particularly raw cranberries, and an outlet 15 at the other end of the trough housing is provided for removal of extracted fruit pieces. The hopper 14 is disposed above the lower end of the screw which is inclined slightly upwardly at angle Θ. A charging line 17 is provided for charging extraction liquid, typically pure water, into the housing 11 and a discharge line 16 for the discharge of liquid extract, a mixture of extraction liquid and juice. The trough temperature may be controlled (e.g., by heating or cooling with a circulating water jacket (not shown) positioned about the trough) to control the process temperature. Alternatively or in addition the temperature of the fruit or extraction liquid may be preselected prior to introduction to the extractor. The screw conveyor is operated by intermittently reversing the direction of rotation of the screw. The reversal helps the relatively compacted mass of matter being extracted to be opened up enhancing the penetration of extracting liquid. Other details of a suitable countercurrent extractor are described in U.S. Pat. No. 4,363,264, the entire contents of which are hereby incorporated by reference. Commercially available fruit extractor units (e.g., CCE Model 275, Howden Equipment Services Pty, Ltd., Sydney, Australia) may be modified and operated with beneficial results as described further below.

Figure 2:
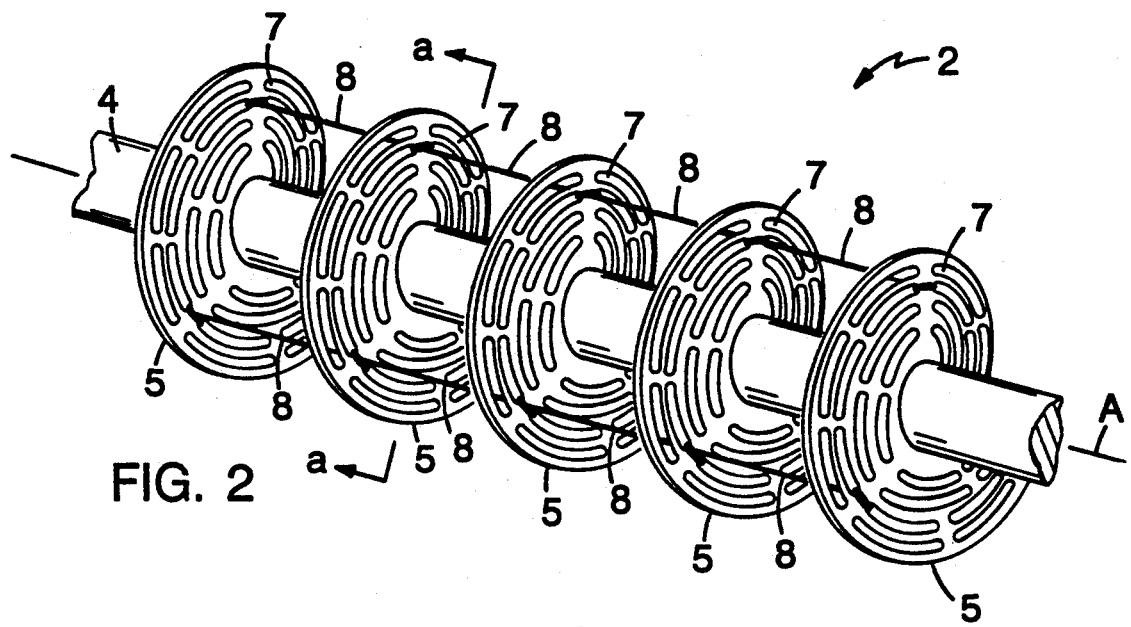
FIG. 2 is a perspective schematic of a screw conveyor.
Figure 2A:
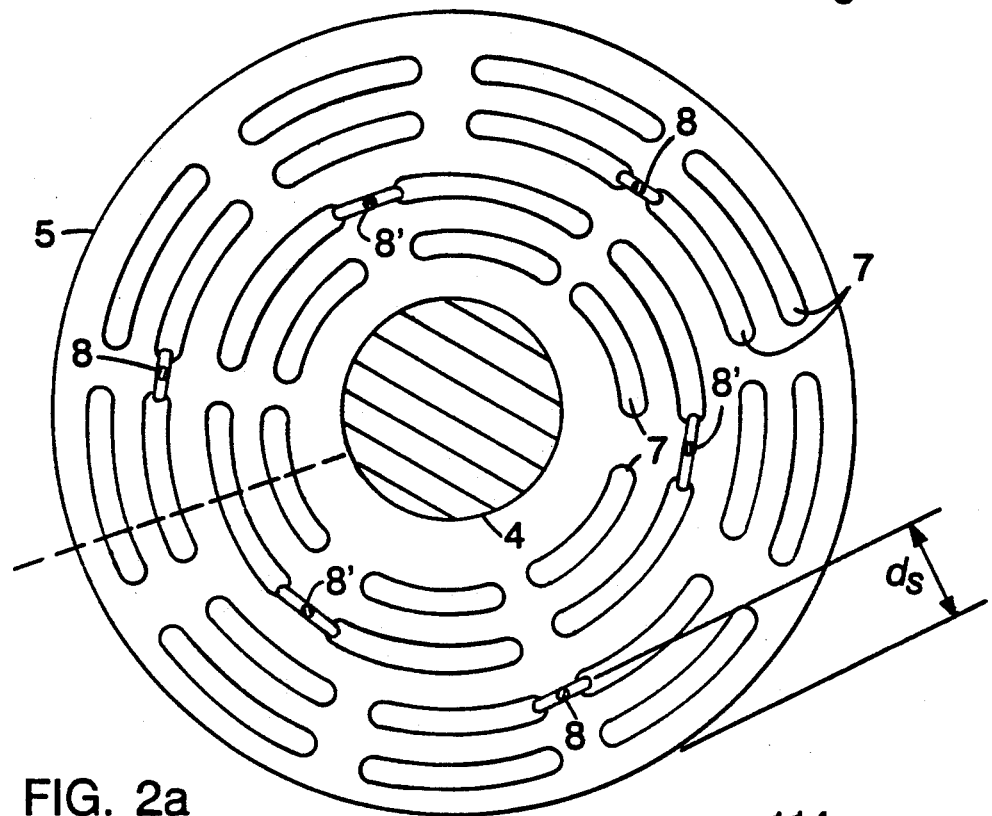
FIG. 2a is an end-on view of the screw conveyor of FIG. 2, taken along the lines a—a.

Referring to FIGS. 2 and 2a, the screw conveyor 2 includes a series of vertical, helical flights 5, having wire or rod longitudinal members 8 positioned between adjacent flights and extending longitudinally generally parallel to the conveyor shaft 4 which has an axis A (corresponding to the axis of the flight). As shown particularly in FIG. 2a, the wire members 8, may be tied to slits 7 of the flights 5. Typically, the wires are positioned at least about 10 percent and preferably no more than about 70 percent the distance from the outer periphery of each flight to the axis A and equidistantly in a circumferential pattern. The wires must be stiff enough to pass through the fruit mass without excessive bending to cause the fruit to uniformly tumble along the length between the flights of the conveyor as the shaft rotates. In particular embodiments, (employing CCE Model 275), a set of wires is positioned at $d_s$, about 1.5 inch from the periphery for flights of 10.8 inch diameter (wires positioned about 25% of the distance from the periphery to the axis), and three wires are used of a diameter with approximately 0.06 inch. (The diameter of shaft 4 is about 2.9 inches.) An optional second set of wires 8' (FIG. 2a only) may be provided at a distance of about 3 inch from the periphery (about 50% of the distance from the periphery to the axis). In some embodiments, especially with larger flights, multiple circumferential sets of wires may be provided at various radii between the axis and periphery. In some embodiments, the wires might be positioned closer to the axis between flights near the raw fruit inlet 14 than between flights near the extracted fruit outlet 15. Positioning the wires further from the axis within the specified range has a greater tumbling effect near the decharacterized fruit outlet 15 where the fruit is usually more compacted. Typically, about 1 to 12 wires per square foot of flight area are provided. Preferably, the longitudinal members are positioned equi-distantly radially and circumferentially. Preferably, longitudinal members are provided between adjacent flights for the entire length of the conveyor.

As further described in the Examples below, it has been found that, by employing longitudinally extending members, such as wires 8, improved efficiency in extraction of juices from fruit may be achieved, even in the case of firm berry fruits such as cranberries. In addition, it has been found that a countercurrent apparatus, as described, can be used for the infusion of fruit decharacterized by extraction to provide new food products. In this case, extracted, decharacterized fruit is placed in the inlet hopper 14 and an infusion liquid carrying a desired flavor is introduced through charging line 17. The infused fruit product exits outlet spout 15. The use of members 8 also improves efficiency of the infusion.

Preferred and typical parameters for operation of a countercurrent apparatus with the improved conveyor for extraction of cranberries are given in Table I below and parameters for infusion of decharacterized cranberries with an improved conveyor are given in Table II below. "Extract level" and "infusion liquid level" refers to the depth of these liquids compared to the screw flight nearest the discharge line 16. The "process temperature" is the temperature of the liquid in the trough. (The temperature of liquid in the trough is typically measured about one half the length of the trough from the fruit inlet and is generally the highest temperature along the trough in cases where unheated fruit and liquid are introduced at either end.) The screw rotation is the speed at which the screw rotates in any direction (e.g. during intermittent rotation). The water/fruit and infusion syrup/fruit feed rate ratio are the weight ratios of the rates at which these components are fed to the trough. For operation with a preferred countercurrent apparatus, CCE model 275 modified as discussed, the berry weight in the trough and berry feed rate are also given. (It will be understood that desired feed rates for liquid and fruit for an infusion or extraction apparatus of any size may be calculated from the tables below, knowing the trough capacity of the particular unit used and the range of feed ratios specified below.)

TABLE I

| Process Variable | Range | Typically |
|---|---|---|
| inclined ange Θ (degrees) | 2 to 6 | 4 |
| process temperature (deg. F.) | 45 to 75 | 65 |
| fruit residence time (minutes) | 30 to 180 | 135 |
| screw rotation (rpm) | 1 to 4 | 2 |
| water/fruit feed rate ratio (weight ratio) | 1:1 to 4:1 | 2.5:1 |
| extract level (% of flight diameter at discharge) | 50 to 70% | 60% |
| For CCE Model 275 | | |
| Berry weight in Trough (lbs) | 70-80 | 75 |
| Berry feed rate (lbs/hr) | 23-160 | 33 |

For infusion of cranberries, the countercurrent apparatus is preferably operated with the parameters in Table II below.

TABLE II

| Process Variable | Range | Typically |
|---|---|---|
| inclined angle θ (degrees) | 2 to 6 | 4 |
| process temperature (°F.) | 100 to 130 | 110 |
| fruit residence time (minutes) | 120 to 300 | 240 |
| screw rotation (rpm) | 1 to 4 | 2 |
| infusion liquid/fruit feed rate ratio (weight ratio) | 2:1 to 6:1 | 3:1 |
| infusion liquid level (% of flight diameter at discharge) | 50 to 70% | 60% |
| For CCE Model 275 | | |
| dicharacterized fruit weight in Trough (lbs.) | 65-75 | 70 |
| decharacterized fruit feed rate (lbs/hr.) | 13-38 | 17.5 |

Process

Figure 3:
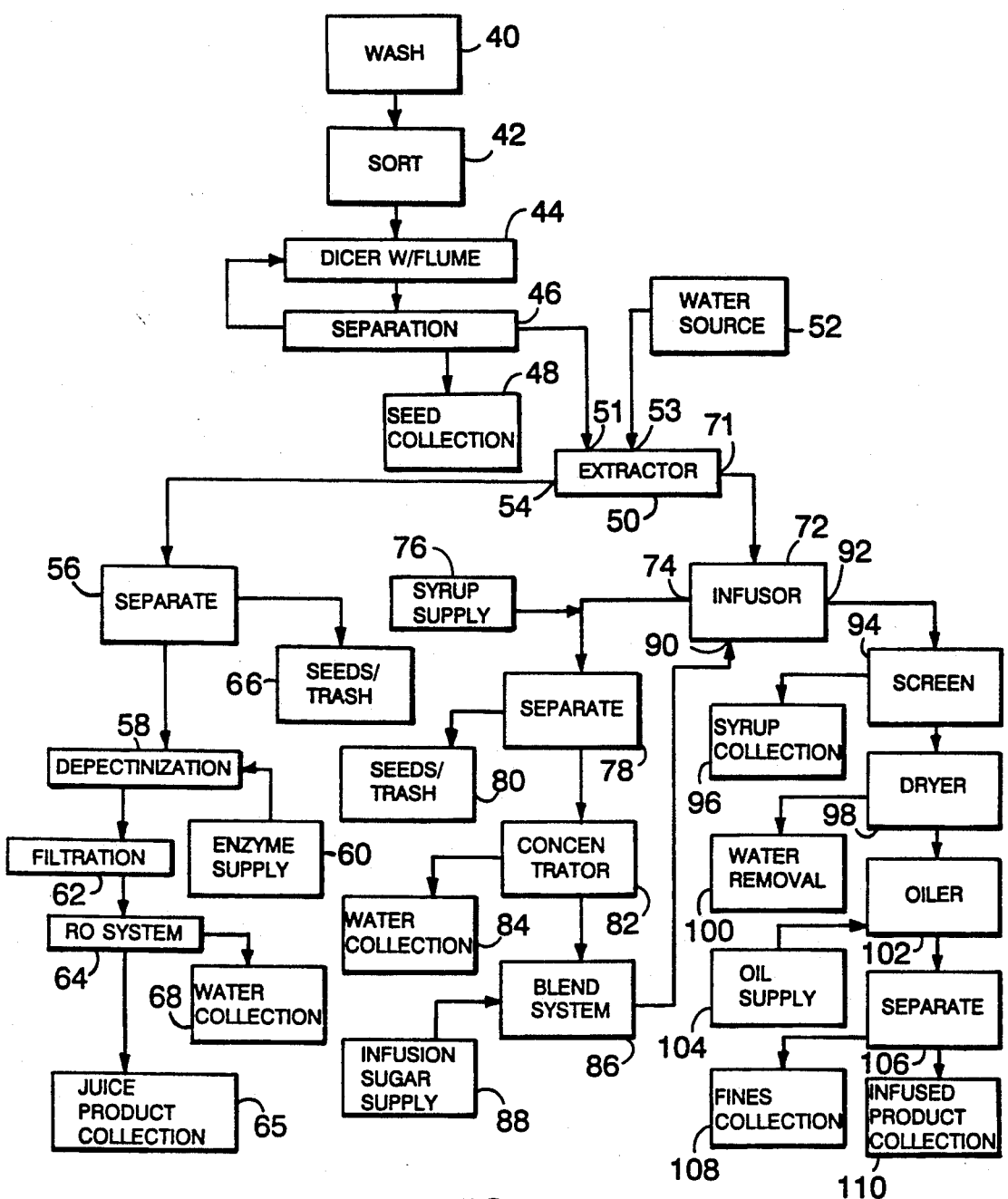
FIG. 3 is a flow diagram of a fruit extraction/infusion process.

Referring now to FIG. 3, a flow diagram is shown of a preferred process employing extraction followed by infusion and preferably using countercurrent apparatus as described above with respect to FIGS. 1-2a. (It will be understood that other extractors and infusers may be used in the process.) The process will be described for use with cranberries, although it may be adapted for use with other fruit, especially firm fruit.

Whole raw fruit which has been bulk frozen is provided to a cleaning stage 40 to remove debris such as twigs, leaves, soil, etc. and then conveyed to a sorting stage 42 which sorts fruit of a selected size, within a selected deviation, and removes rotten or damaged fruit. The freezing of the fruit prior to further processing is believed to be an important aspect of the invention, in that, upon rethawing, the fruit is structurally more susceptible to juice extraction. Again, the deleterious effect on juice quality associated with high temperature treatment (or the use of enzymes) is avoided. The frozen fruit is in the raw state, without having been boiled or otherwise cooked prior to processing. The frozen fruit (e.g., initially at about 25° F.) thaws naturally upon exposure to the flume water (e.g., about 55° F.) and the extraction trough (e.g., about 65° F.) without any substantial heating. As discussed above, generally, exposure to heat is avoided especially prior to and during extraction, so that the fruit is not exposed to average process temperatures above about 75° F.

Control over the average size and standard deviation of the raw fruit is also believed an important attribute of the present process whereas a uniformly sized infused product ultimately results. In the case of cranberries, preferably the sorted berries are 16 to 20 millimeters (mm) in diameter with a standard deviation of about 1 mm. The size-selected fruit is later passed to a dicer stage 44 (Model RG-6, A. B. Hallde Maskiner, Kista, Sweden) which slices the berries to expose the inner pulp of the fruit unprotected by the skin. The whole cranberries are preferably cut in half to provide slices between 8 to 10 millimeters in width, although other skin penetrating treatments such as scarifying may also be used.

The sliced fruit is transported by means of a flume to a separation stage 46, including a vibrating screen separation apparatus (Model LS24S444, Sweco, Inc., Florence, Ky.) which separates the sliced fruit from the flume water, recycling water back to the flume, and removes seeds at a seed collection stage 48. The sliced fruit is then provided to the solid input 51 of an extractor stage 50 which employs a countercurrent extractor which may be as previously described with respect to FIGS. 1-2a and operated within the limits of Table I. The liquid input 53 to the extractor is the extraction liquid, typically pure water without added enzyme, from a supply 52. The liquid output 54 of the extractor stage is an enzyme-free, high-quality extract mixture of extraction liquid and fruit juice which exhibits desirable qualities such as low tannin content. The extractor, preferably operating at low temperatures, but at high efficiency, avoids the detrimental effects on juice quality normally associated with higher temperature extraction, such as reduced shelf-life characteristics, burnt notes in the juice flavor and higher tannin levels. The raw juice extract from the extractor stage liquid output 54 is further treated, first in a separation stage 56, using a vibrating screen separator (Model LS24S444, Sweco, Inc., Florence, Ky.) which collects in collection stage 66 any remaining seeds and solids. The juice extract is further treated in a depectinization stage 58 in which pectinase enzyme is provided from a supply 60 and mixed with the juice extract. The enzyme, in small amounts (between about 0.01 and 0.1 percent) clears the juice extract of pectin in preparation for a filtration stage 62. Whereas the juice has already been extracted from the fruit, the enzyme plays no substantial role in the overall extraction process and thereby only small amounts of the enzyme, known to be an expensive process ingredient, need be used. Filtration at stage 62 is achieved by means of a microfilter of 0.1–0.5 micron pore size. The filtered juice extract is further treated at a reverse osmosis stage 64, (Model BRO, Paterson Candy, Inc.) where the juice extract is passed through a membrane system under pressure to concentrate the final juice product, which is collected at stage 65 as is the excess water at stage 68. Typically, the final juice product is of about 18 brix. The cranberry juices produced by the process typically have a tannin content less than about 1900 mg/L, e.g. about 1700 mg/L (measured at 7.5 brix).

Decharacterized cranberry pieces, exiting the solid output 71 of extraction stage 50, are typically characterized by the removal of about 96 percent of the soluble solids and about 80 to 96 percent of the color. At higher temperatures, for example, at 85° to 105° F. virtually all of the color can be removed from the decharacterized fruit, if desired. Extraction time can be extended to achieve the same end. Decharacterized fruit lacking all of its original color may be advantageous for producing infused fruit products that are to take on a color other than that of the original fruit. Similarly, for producing an infused product that is characteristic, in appearance, of a cranberry, an amount of the color suggestive of the cranberry is maintained in the decharacterized fruit.

The decharacterized fruit is supplied to an infusion stage 72 including a countercurrent apparatus similar to that used at the extraction stage 50 and as discussed with respect to FIGS. 1–2a, operated in the ranges given in Table II. Liquid input at the infusion stage 72 is the desired infusion liquid such as sugar-water (e.g., fructose) solution, high fructose corn syrup, white grape juice, strawberry juice, raspberry juice, blueberry juice, apple juice and their concentrates. These infusion liquids may include flavoring, e.g., spices such as cinnamon and may be fortified with vitamins, e.g. ascorbic acid, and/or minerals, e.g. iron. The infusion liquid typically has a sugar level of about 72 brix and is provided from a continuous process loop which mixes the spent infusion liquid from the liquid output 74 from infusion stage 72 with syrup from a supply 76 which is then treated in a vibrating screen separator 78 (Model LS24S444, Sweco, Inc., Florence, Ky.) to remove and collect seeds and fines at a collection state 80. The spent infusion mixture is then concentrated at concentration stage 82 including a water collection stage 84 and finally, the liquid is treated at a blend stage 86 which may include input from an infusion sugar supply 88, before being recycled to the liquid input 90 of infuser 72 as the infusion liquid. As discussed above, the infusion liquid can be formulated to include a desired amount of natural or inherent soluble fruit component, equal to or greater than the amount present in the decharacterized fruit so that no net extraction of inherent soluble fruit component into the infusion media occurs during infusion. The infused fruit product has the desired level of inherent soluble fruit component and the spent infusion liquid is concentrated and recycled in its entirety.

The infused fruit product exiting the infusion stage at the solid output 92 is passed to a screening stage 94 at which the infused fruit product is separated from excess infusion liquid coating the solid product, which is collected at collection stage 96. The excess syrup may be provided to syrup supply 76 for recycling to the infuser 72. The infused fruit product is then provided to a dryer stage 98 which passes forced air through the infused fruit product to remove water at stage 100. Drying temperature is typically in the range of about 180° to 200° F. for about 120 minutes using a conventional forced air fruit dryer. The dried, infused fruit product is next passed to an oiler stage 102 which includes an oil supply 104 from which vegetable oil or the like is applied to the fruit product to enhance flowability. A screen separator (Model LS24S444, Sweco, Inc., Florence, Ky.) 106 with a stage 108 is used for collection of any fines and waste. The final dried infused product, maintaining substantial physical integrity of the original fruit, is collected in a collection stage 110 from which it may be bulk packaged. The dried product preferably has a sugar level of about 88 brix.

Figure 4:
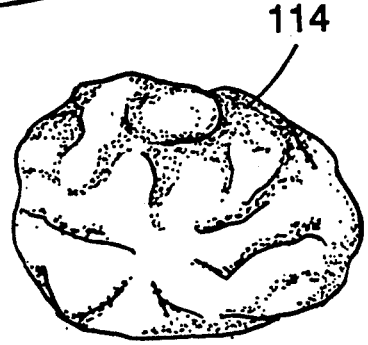
FIG. 4 is a perspective illustration of a dried infused fruit product.

Referring to FIG. 4, a dried infused cranberry fruit product according to the invention is illustrated. The fruit product maintains substantial structural integrity of the original cranberry including the skin 114 and typically a portion of the original color of the cranberry. The flavor of the fruit product however is that of the infusion syrup which may be of many varieties including a controlled amount of flavor of the original fruit. A coating may be applied which also contributes to flavor and/or nutrient value.

The invention will be further described by way of the following examples.

EXAMPLE 1

The process described in FIG. 3 can be operated using raw frozen cranberries as the fruit input. In the extraction stage (referring as well to Table I) the process temperature is about 65° F., with a residence time of about 135 min., a screw rotation of 2 rpm, a water/berry weight ratio of 2.5:1 and extraction liquid (water) level of 60%. The extraction stage produces a decharacterized fruit with 0.3% inherent soluble fruit component. The infusion stage (referring as well to Table II) can employ an aqueous blend of sucrose (68.0%) and cranberry fruit components (4.0%) as the infusion syrup and a countercurrent apparatus identical to that in the extraction stage, operated at a temperature of about 110° F., residence time of about 180 min., screw rotation of about 2 rpm, infusion liquid to berry weight ratio of about 4:1. The spent infusion syrup can then be collected to be concentrated and reformulated as discussed herein. Target inputs and outputs from the various stages are summarized in Table III, below. All calculations are normalized to 8 lbs. of fruit soluble solids per 100 lbs. of cranberries.

TABLE III

| PROCESS STAGE (FIG. 3) | MATERIAL | AMOUNT | CONCENTRATION (WATER PHASE) |
|---|---|---|---|
| 40/42 | FROZEN SORTED CRANBERRIES | 100.0 LBS | 8 brix |
| 44 | FLUME RECYCLE (WATER) | 900.0 LBS | |
| 48 | CRANBERRY SEEDS | 0.3 LBS | |
| 51 | SLICED CRANBERRIES | 99.7 LBS | |
| 53 | WATER | 250.0 LBS | |
| 54/56 | JUICE EXTRACT/WATER | 257.7 LBS | 3 brix |

TABLE III-continued

| PROCESS STAGE (FIG. 3) | MATERIAL | AMOUNT | CONCENTRATION (WATER PHASE) |
|---|---|---|---|
| 60 | ENZYME | 0.1 LBS | |
| 65 | CRANBERRY JUICE/WATER | 43.0 LBS | 18 brix |
| 66 | TRASH (SEEDS/FINES) | 0.1 LBS | |
| 68 | WATER | 214.7 LBS | |
| 71 | EXTRACTED DECHARACTERIZED SLICES | 92.0 LBS | 0.3 brix |
| 74 | SPENT SYRUP | 256.0 LBS | 55 brix |
| 80 | TRASH (SEEDS/FINES) | 0.1 LBS | |
| 84 | WATER | 37.9 LBS | |
| 88 | INFUSION SUGAR | 61.0 LBS | |
| 90 | INFUSION SYRUP | 284.0 LBS | 72 brix |
| 92/94 | INFUSED FRUIT PIECES | 120.0 LBS | 55 brix |
| 96 | EXCESS SYRUP | 5.0 LBS | 55 brix |
| 100 | WATER | 41.6 LBS | |
| 104 | OIL | 0.1 LBS | |
| 108 | FINES | 17.5 LBS | |
| 110 | DRIED INFUSED FRUIT SLICES | 56.0 LBS | 88 brix |

The cranberry juice product provided by the process at stage 65 typically has a tannin content less than about 1900 mg/L (at 7.5 brix), and has no noticeable off-flavors associated with heat abuse. As the table indicates, the process is highly efficient for the production of cranberry juice with 43 lbs. of juice (at 18 brix) being produced from 100 pounds of cranberries. This corresponds to 96% recovery on a weight basis (FSP, fruit soluble solid pounds, i.e., percent fruit soluble solid recovery based on weight of fruit soluble solid in raw fruit compared to that recovered in the extract). In addition, the process provided a new fruit product in the way of infused cranberry slices having the sweetened flavor of the infusion syrup.

EXAMPLE 2

The efficiency of juice recovery employing an improved extractor was illustrated by a series of comparative experiments (experiments 1 to 6) in which process parameters for extraction were varied, as summarized in Table IV below.

TABLE IV

| Process parameter | Experiment | | | | | |
|---|---|---|---|---|---|---|
| | 1 | 2 | 3 | 4 | 5 | 6 |
| Unit Size | pilot | pilot | pilot | pilot | pilot | commercial |
| Enzymes in Extraction Liquid | Yes | No | No | No | No | No |
| Improved Extractor (FIGS. 1-2a) | No | No | Yes | Yes | Yes | Yes |
| Residence Time (min) | 90 | 90 | 90 | 135 | 160 | 135 |
| Extraction Temperature (°F.) | 85–115 | 85–115 | 85–115 | 85–115 | 69–75 | 65 |
| Efficiency % FSP recovery | 75 | 67 | 84 | 96 | 96 | 96 |
| Relative Tannin Content mg/L | 2146 | 1950 | 2381 | 2292 | 1734 | 1273 |

In Experiment 1, a pilot sized extractor unit (nominal capacity=30 kilograms per hour) was used to extract juice from cranberries, employing in the extraction liquid enzymes effective in pectin breakdown (about 0.07–0.15 lbs./100 lbs. feed). The extractor was of a commercially available type (CCE Model 275, Howden Equipment Services Pty, Sydney, Australia). The efficiency of extraction was approximately 75% of available FSP with a relatively high (2146 mg/L, measured at 7.5° brix) tannin content.

In Experiment 2, similar process conditions were employed, with the exception that no enzyme was introduced to the extraction liquid. The efficiency of extraction dropped to about 67% of available FSP.

In Experiment 3, the extractor unit was modified as described with respect to FIGS. 1-2a; a series of longitudinally extending wires were provided between adjacent flights of the extractor screw. Surprisingly, by employing the improved countercurrent unit, extraction efficiency increased to about 84% of available FSP recovery without the use of enzymes, representing a significant improvement over operation of the conventional extractor (even with the use of enzymes).

In Experiment 4, the improved countercurrent apparatus was operated with extended residence time (135 minutes) compared to Experiment 3 (90 minutes). Under these conditions, extraction efficiency increased to about 96% of available FSP recovery.

In Experiment 5, the extraction temperature was reduced to about 69°–75° F., compared to about 85° to 115° F. used in Experiments 1 to 4 (with the residence time marginally increased). Surprisingly, the extraction efficiency remained at about 96% of available FSP recovery and the resulting juice product was of improved quality over that of experiments 1 to 4, in that the juice exhibited significantly lower tannin levels.

In Experiment 6, the extraction efficiency of a much larger commercial scale extraction unit (CCE model 500, nominal capacity=500 kilograms per hour) was investigated and the results compared to that obtained with the smaller pilot scale unit used in the previous experiments. The unit employed an extractor screw modified to include longitudinally extending wires between adjacent flights and was operated at an extraction temperature of 65° F., with residence times of about 135 minutes. The extraction efficiency was similar to that obtained in the smaller unit.

Other embodiments are within the following claims.

We claim:

1. A method for efficiently extracting from fruit a juice that has not been exposed to high temperatures, comprising:
   providing raw fruit in a dimensionally stable form,
   penetrating the skin of said fruit to expose the inside of said fruit, unprotected by skin,
   treating said fruit with an extraction liquid in a countercurrent apparatus by advancing said fruit along a path while flowing said liquid countercurrently to said advancing fruit and uniformly, continuously tumbling said fruit while treating said fruit with said liquid,
   maintaining a process temperature of about 75° F. or less during said extracting and,
   collecting said liquid extracted from said fruit to provide said juice that has not been exposed to high temperatures.

2. The method of claim 1 wherein the residence time of said fruit during said extracting in said countercurrent apparatus is greater than about 90 minutes.

3. The method of claim 2 wherein the residence time is about 120 to 150 minutes.

4. The method of claim 3 further comprising freezing said raw fruit prior to said providing step.

5. The method of claim 4 wherein said extraction liquid is water substantially free of pectinase enzymes.

6. The method of claim 1 or 5 wherein said uniformly tumbling includes tumbling between flights of a screw conveyer by passing narrow longitudinal members positioned parallel to the axis of said screw conveyer through said fruit.

7. The method of claim 6 wherein said fruit is cranberry.

8. A method for processing fruit, comprising:
   providing raw fruit,
   penetrating said fruit to expose the inside of said fruit, unprotected by the skin,
   countercurrently extracting said fruit with an extraction liquid while maintaining conditions, including a low temperature, that provide extracted fruit with substantially the structural integrity of the raw fruit, and a fruit extract that has not been exposed to high temperatures,
   collecting the extract from said fruit,
   collecting the extracted fruit, and
   countercurrently infusing said extracted fruit with an infusion liquid while maintaining conditions that provide an infused fruit with substantially the structural integrity of the raw fruit, and
   collecting said infused fruit.

9. The method of claim 8 comprising freezing said raw fruit prior to said providing step.

10. The method of claim 8 further comprising collecting spent infusion liquid after said countercurrent infusion, concentrating said spent liquid and recycling said concentrated liquid in its entirety for subsequent infusion.

11. The method of claim 10 comprising:
    extracting said fruit to provide a decharacterized fruit having a selected level of inherent soluble fruit component, and
    formulating said infusion liquid to have a level of inherent soluble fruit component substantially equal to or greater than said level in said decharacterized fruit 12. The method of claim 8 wherein said decharacterized fruit has been extracted of about 94 to 98% of soluble solids.

13. The method of claim 8 wherein said infusion liquid includes a liquid selected from fruit juice or fruit juice concentrate, corn syrup, sugar-water solutions, and artificial sweeteners or combination thereof.

14. The method of claim 13 wherein the infusion liquid is fortified with a material selected from the group consisting of vitamins, flavorings, minerals, and combinations thereof.

15. The method of claim 8 wherein said infusion fruit to about 60 to 80 brix.

16. The method of claim 8 comprising infusing said fruit to about 40 to 55 brix.

17. The method of claim 16 further comprising drying said infused fruit to remove water.

18. The method of claim 17 comprising drying said infused fruit to about 40 brix or greater.

19. The method of claim 17 comprising drying said infused fruit to a water activity of about 0.5 to 0.55.

20. The method of claim 8 wherein the extraction liquid is water substantially free of pectinase enzymes.

21. The method of claim 20 comprising extracting said fruit by advancing said fruit and flowing an extracting liquid countercurrently to said advancing fruit, while continuously uniformly tumbling said fruit between the flights of a screw conveyor by passing narrow longitudinal members parallel to the axis of said conveyer through said fruit.

22. The method of claim 21 further comprising infusing said decharacterized fruit by advancing said fruit and flowing an infusing liquid countercurrently to said advancing fruit, while continuously uniformly tumbling said fruit between the flights of a screw conveyor by passing narrow longitudinal members parallel to the axis of said conveyer through said fruit.

23. The method of claim 22 further comprising maintaining the temperature at about 75° F. or less during said extracting step.

24. The method of claim 23 comprising maintaining a residence time of said fruit of greater than about 90 minutes during said extraction.

25. The method of claim 24 wherein the residence time of said fruit is about 120 to 150 minutes.

26. The method of claim 25 comprising maintaining a process temperature of about 100° to 130° F. during said infusing.

27. The method of claim 26 comprising maintaining a residence time of said fruit of about 120 to 300 minutes during said infusing.

28. The method of any one of claims 8, 20 or 23 wherein said fruit is cranberry.

29. A method for processing fruit, comprising:
    providing raw fruit,
    penetrating said fruit to expose the inside of said fruit, unprotected by the skin, extracting said fruit with an extraction liquid to provide decharacterized fruit having a desired level of inherent soluble fruit component,
collecting the extract from said fruit,
collecting the decharacterized fruit,
formulating an infusion liquid having inherent soluble fruit component at a level equal to or greater than said decharacterized fruit,
infusing said decharacterized fruit with said infusion liquid without net extraction of said inherent soluble fruit component from said decharacterized fruit,
collecting a spent infusion liquid after said infusing,
concentrating said spent liquid,
recycling said concentrated spent infusion liquid for subsequent infusion, and
collecting said infused fruit.

30. The method of claim 29 including reformulating said infusion liquid by the addition of non-inherent soluble component to said concentrated spent syrup.

31. The method of claim 30 including reformulating said infusion liquid by the addition of inherent soluble fruit component to said concentrated spent liquid.

32. The method of claim 31 wherein said infusing includes countercurrently infusing.

33. The method of claim 32 wherein said extraction liquid is water-free of pectinase enzymes.

34. The method of claim 29 or 33 comprising freezing said raw fruit prior to said providing step.

35. The method of claim 34 comprising maintaining a process temperature of about 75° F. or less during said extracting step.

36. The method of any one of claims 1, 5, 7, 23, 29 or 35 wherein said fruit is cranberry and said extract has a tannin content of less than about 1900 mg/L measured at 7.5 brix.

37. A raw cranberry fruit food product, comprising:
a decharacterized cranberry fruit piece having removed therefrom at least about 90% of its inherent soluble solids and including therein a flavor liquid, said product having a brix of about 40 or greater.

38. The food product of claim 37 wherein about 94 to 98% of the soluble solids have been removed.

39. The food product of claim 37 wherein the syrup is a fruit flavor different from the fruit piece.

40. The food product of claim 37 wherein said decharacterized fruit is free from added enzyme degradation, substantially maintaining the structural integrity of the raw fruit, being untreated by pectinase enzymes.

41. The food products of claim 37 wherein said decharacterized fruit has been extracted of about 50% or more of its original color.

* * * * *

UNITED STATES PATENT AND TRADEMARK OFFICE
CERTIFICATE OF CORRECTION

PATENT NO.   : 5,320,861

DATED        : Jun. 14, 1994

INVENTOR(S)  : Harold L. Mantius et al.

It is certified that error appears in the above-identified patent and that said Letters Patent is hereby corrected as shown below:

Column 1, line 31, delete "non", insert therefor --nor--.

Column 2, line 34, delete "C" in the word concentrated, insert therefor lower case --c--.

Column 14, claim 15, delete "fruit to about", insert therefor --liquid has--.

Signed and Sealed this

Tenth Day of September, 1996

Attest:

BRUCE LEHMAN

*Attesting Officer*     Commissioner of Patents and Trademarks